United States Patent [19]

Shimizu et al.

[11] Patent Number: 5,298,846
[45] Date of Patent: Mar. 29, 1994

[54] DRIVE UNIT FOR DRIVING A STEPPING MOTOR

[75] Inventors: Michihiro Shimizu, Takefu; Yasuhiro Kondo, Hirakata, both of Japan

[73] Assignee: Matsushita Electric Industrial Co., Ltd., Osaka, Japan

[21] Appl. No.: 883,475

[22] Filed: May 15, 1992

[30] Foreign Application Priority Data

May 16, 1991 [JP] Japan .................. 3-111553

[51] Int. Cl.$^5$ .............................. G05B 19/40
[52] U.S. Cl. ..................... 318/685; 318/696
[58] Field of Search ................. 318/685, 696

[56] References Cited

U.S. PATENT DOCUMENTS

| Re. 31,229 | 5/1983 | King | 318/685 |
| 4,608,527 | 8/1986 | Glennon et al. | 318/685 |
| 4,734,631 | 3/1988 | Kamikura et al. | 318/685 |
| 4,772,841 | 9/1988 | Maruyama et al. | 318/685 |

Primary Examiner—William M. Shoop, Jr.
Assistant Examiner—Karen Masih
Attorney, Agent, or Firm—Ratner & Prestia

[57] ABSTRACT

In a rotation detecting unit for detecting rotation conditions such as a rotating position and speed of a stepping motor from a rotation signal of a motor without using any external sensor such as a potentiometer or encoder, by providing detection coils a and b to the main coils A, A', B, and B' provided at the stator of a stepping motor 2, the terminal voltages E2a and E2b outputted from the detection coils a and b are sequentially subjected to a signal processing in a rotation detecting circuit 1. The rotation detecting circuit 1 is provided with an output amplifier circuit 3, a signal processing circuit 4, a subtractive calculation circuit 5 for removing unnecessary voltage components by utilizing voltages E8A, E8A', E8B, and E8B' output from a charge/discharge circuit 8, a waveform shaping circuit 6 for converting the waveform of each input signal into waveforms processable in a digital form, a diagnosing circuit 7 for diagnosing whether the motor is rotating normally, and a control circuit 9' for controlling the motor in conformity with an output of the diagnosing circuit 7, whereby a superior stepping motor control can be achieved. By further providing an application voltage subtractive calculation circuit for a subtraction of application voltage components applied to the main coils A, A', B, and B', the rotation detecting coils a and b can be eliminated.

11 Claims, 11 Drawing Sheets

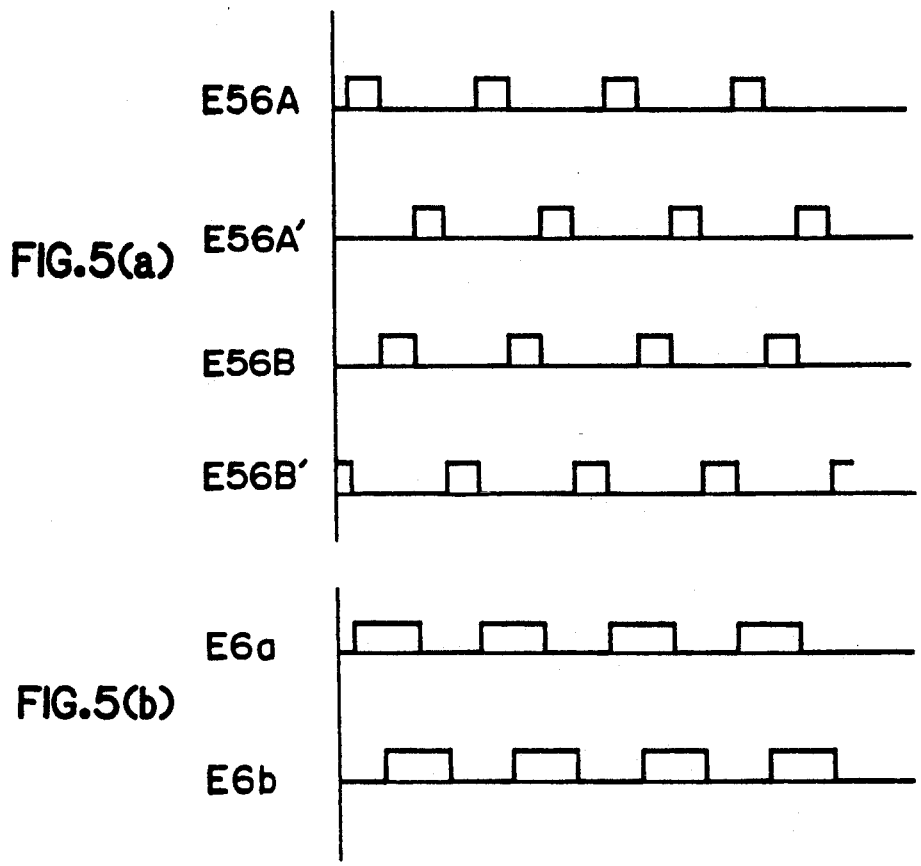
FIG.5(a)
FIG.5(b)
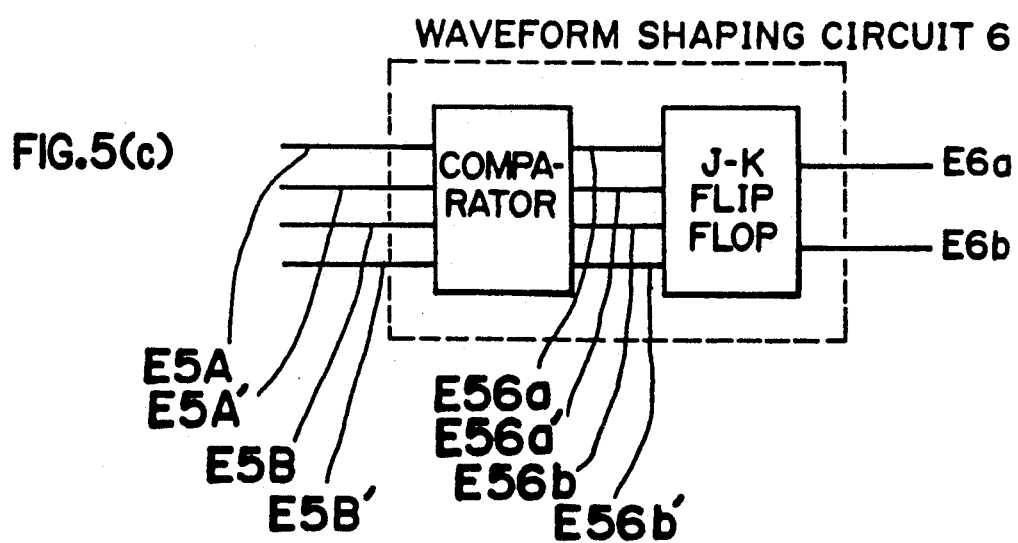
FIG.5(c)

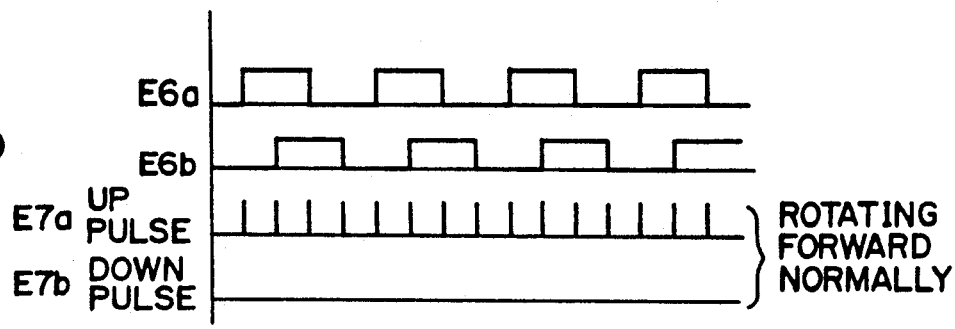
FIG.6(a) — ROTATING FORWARD NORMALLY
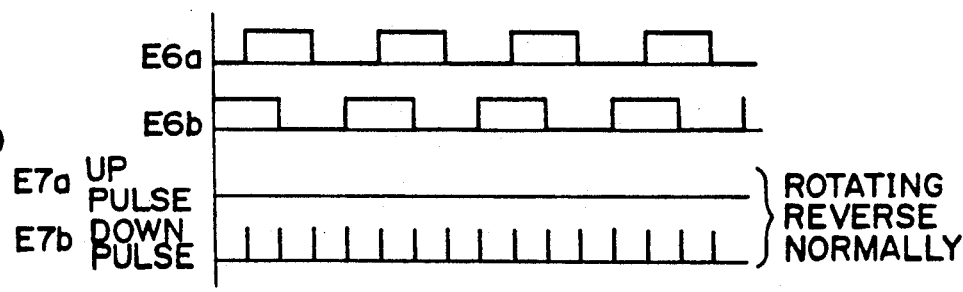
FIG.6(b) — ROTATING REVERSE NORMALLY
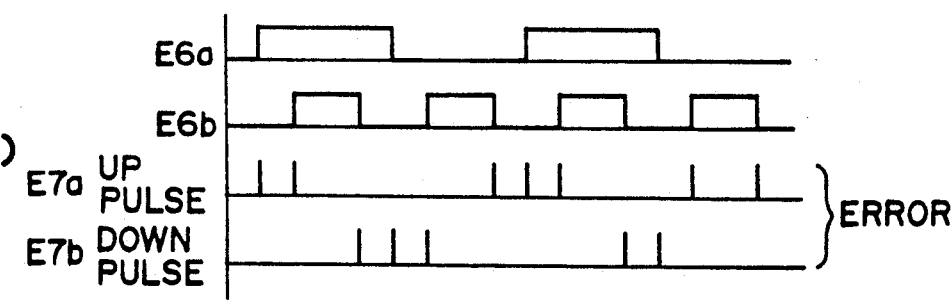
FIG.6(c) — ERROR
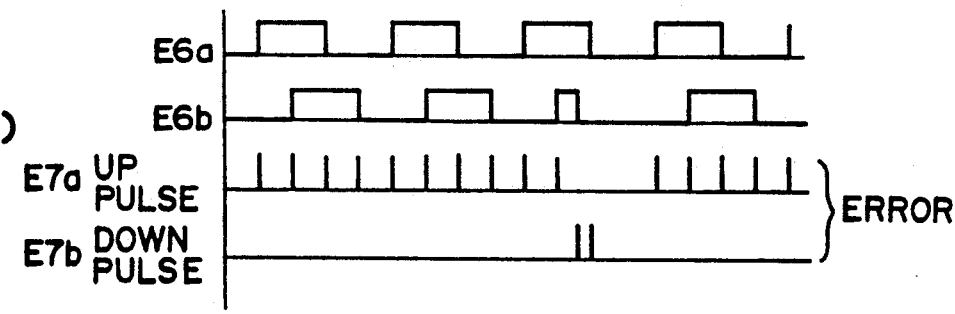
FIG.6(d) — ERROR

| STATUS | A-PHASE | B-PHASE | UP PULSE | DOWN PULSE |
|---|---|---|---|---|
| 1 | H | H→L | | l |
| 2 | H | L→H | l | |
| 3 | L | H→L | l | |
| 4 | L | L→H | | l |
| 5 | H→L | H | l | |
| 6 | L→H | H | | l |
| 7 | H→L | L | | l |
| 8 | L→H | L | l | |

DRIVE UNIT FOR DRIVING A STEPPING MOTOR

BACKGROUND OF THE INVENTION

1. Field of the Invention

The present invention relates to a stepping motor drive unit for diagnosing whether a stepping motor is rotating normally through detection of rotating conditions such as the rotating position and speed of the stepping motor, thereby correcting any error condition into a normal condition when an abnormal or error condition of the stepping motor is detected.

2. Description of the Prior Art

In recent years, there has been a rapid growth in using stepping motors both in the industrial and general consumer fields. A large number of stepping motors provided with rotation detecting means have been used for detecting error conditions such as step-out of the motors, and when abnormal or error conditions of the stepping motors are detected, the error conditions can be corrected into normal conditions.

The following describes a drive unit belonging to a conventional stepping motor having a rotation detecting function.

FIG. 12 (a) shows a block diagram of a rotation detecting unit using a potentiometer adopted as a conventional rotation detecting sensor and FIG. 12 (b) shows an example of the output of the potentiometer. The unit in FIG. 12 (a) includes a stepping motor 2, a rotor 2R for the stepping motor 2, and main coils A, A' and B, B' provided at the stator of the stepping motor 2. A potentiometer 12 is mechanically connected to the stepping motor 2 via a joint 11. The unit further includes a power source 10 and a drive circuit 9 for the stepping motor 2, both the power source 10 and the drive circuit 9 being connected to the main coils A, A' and B, B' of the stator. The potentiometer 12 has an output terminal 12' yielding an output voltage E12 which is applied to a control circuit 9' built in the drive circuit 9.

The following describes the operation of the drive unit of the conventional stepping motor using the output of the potentiometer.

In FIG. 12 (a), firstly each of the main coils A, A', B, and B' is excited according to the phase relation as shown in FIG. 2 to thereby rotate the rotor 2R of the stepping motor 2. With the rotation of the rotor 2R, the joint 11 rotates, and the output voltage E12 at the output terminal 12' of the potentiometer 12 changes according to the rotation angle of the joint 11. FIG. 12 (b) shows an example of the output voltage E12 of the potentiometer 12.

Upon detecting the output voltage E12 of the potentiometer 12 by the control circuit 9', it is judged whether the stepping motor 2 is rotating normally, with which operation any error condition can be corrected.

There has been proposed another conventional method of carrying out a rotation detecting operation by utilizing a terminal voltage of the stepping motor (which means a voltage induced between the terminal of the motor and the ground) in the same manner as the present invention. The above-mentioned conventional method employs a transformer provided outside the motor and one winding of the transformer is connected to one phase line of the main coils of the motor to utilize the voltage induced in the secondary winding of the transformer.

However, in the conventional construction mentioned above, there must be provided outside the motor a separate sensor such as a potentiometer or an external component having a comparatively large current capacity such as a transformer. Particularly when a sensor is used, a connection with the motor or a load is necessary, and the connection exerts an influence to make the sensor have a hysteresis characteristic to result in deteriorating the accuracy in position. Furthermore, the sensor problematically has a serious limitation regarding the anti-environmental property thereof. Use of an external component having a large capacity leads to no merit in cost, and furthermore a certain consideration must be taken for the inherent electric constant of the external component to result in difficulty in mass production.

SUMMARY OF THE INVENTION

Accordingly, an essential object of the present invention is to provide a drive unit for a stepping motor, the drive unit obtaining a signal representative of the rotation of the rotor from a voltage induced in a main coil of the stepping motor and diagnosing the rotation condition of the motor by the signal to correct any error condition without use of a separate external sensor nor component having a large capacity as in the conventional unit.

In order to achieve the above-mentioned object, a stepping motor drive unit in accordance with the present invention comprises: a main coil provided at a stator of a stepping motor; a rotation detecting coil; a charge/discharge circuit, a subtractive calculation circuit for subtracting an output of the charge/discharge circuit from an output of the rotation detecting coil; an output amplifier circuit for amplifying the output of at least one phase line of the charge/discharge circuit, a signal processing circuit for processing the output signal of any one of the subtractive calculation circuit, the rotation detecting coil, and the charge/discharge circuit; a waveform shaping circuit for shaping the output waveform of the signal processing circuit; a diagnosing circuit for diagnosing whether the motor is rotating normally by detecting the output of the waveform shaping circuit; and a control circuit for controlling the motor according to the output of the diagnosing circuit. Further by providing an application voltage subtractive calculation circuit for subtraction of the voltage applied to the main coil of the stepping motor, the rotation detecting coil can be eliminated.

With the above-mentioned construction, a terminal voltage yielded at the main coil of the stepping motor is detected by means of the main coil or a rotation detecting coil, and the terminal voltage is amplified by an amplifier, processed by a signal processor, calculated by a subtractive calculation circuit, shaped by a waveform shaping circuit, diagnosed by a diagnosing circuit, and controlled by a control circuit thereby to discriminate whether the rotation of the stepping motor is normal or abnormal, correcting any error condition.

BRIEF DESCRIPTION OF THE DRAWINGS

These and other objects and features of the present invention will become apparent from the following description taken in conjunction with the preferred embodiment thereof with reference to the accompanying drawings, in which:

FIG. 3 (b) is a chart of output waveforms E3a and E3b of an output amplifier circuit 3 in accordance with the first embodiment of the present invention;

FIG. 3 (c) is a chart of output waveforms E4a and E4b of a signal processing circuit 4 in accordance with the first embodiment of the present invention;

FIG. 4 (b) is a chart of output waveforms E5A, E5A', E5B, and E5B' of a subtractive calculation circuit 5 in accordance with the first embodiment of the present invention;

FIG. 5 (a) is a chart of output waveforms E56A, E56A', E56B, and E56B' of a comparator provided in the waveform shaping circuit 6 in accordance with the first and second embodiments of the present invention;

FIG. 5 (b) is a chart of output waveforms E6A and E6B of the waveform shaping circuit 6 in accordance with the first and second embodiments of the present invention;

FIG. 5 (c) is a block diagram of the waveform shaping circuit 6 in accordance with the first and second embodiments of the present invention;

FIG. 6 (a) is a chart of output waveforms E6a and E6b of the waveform shaping circuit 6 and output waveforms E7a and E7b of a diagnosing circuit 7 observed when the motor is normally rotating forward in accordance with the first and second embodiments of the present invention;

FIG. 6 (b) is a chart of output waveforms E6a and E6b of the waveform shaping circuit 6 and output waveforms E7a and E7b of the diagnosing circuit 7 observed when the motor is normally rotating reverse in accordance with the first and second embodiments of the present invention;

FIG. 6 (c) is a chart of output waveforms E6a and E6b of the waveform shaping circuit 6 and output waveforms E7a and E7b of the diagnosing circuit 7 observed when the motor is in an error condition;

FIG. 6 (d) is a chart of other output waveforms E6a and E6b of the waveform shaping circuit 6 and other output waveforms E7a and E7b of the diagnosing circuit 7 observed when the motor is in an error condition;

FIG. 7 (b) is a block diagram of the diagnosing circuit 7 in accordance with the first and second embodiments of the present invention;

FIG. 9 (b) is a chart of waveforms VA, VA', VB, and VB' of the application voltage components in accordance with the second embodiment of the present invention;

FIG. 9 (c) is a chart of output waveforms E13A, E13A', E13B, and E13B' of an application voltage component subtractive calculation circuit 13 in accordance with the second embodiment of the present invention;

FIG. 10 (b) is a chart of output waveforms E3a, E3b, E3a', and E3b' of the output amplifier circuit 3 in accordance with the second embodiment of the present invention;

FIG. 10 (c) is a chart of output waveforms E4a, E4b, E4a', and E4b' of the signal processing circuit 4 in accordance with the second embodiment of the present invention;

FIG. 11 (b) is a chart of output waveforms E5A, E5A', E5B, and E5B' of the subtractive calculation circuit 5 in accordance with the second embodiment of the present invention;

FIG. 12 (b) is a graph showing an example of the output E12 of the potentiometer in FIG. 12 (a).

DESCRIPTION OF THE PREFERRED EMBODIMENTS

First Embodiment

The following describes a first embodiment of the present invention with reference to the drawings.

Figure 1:
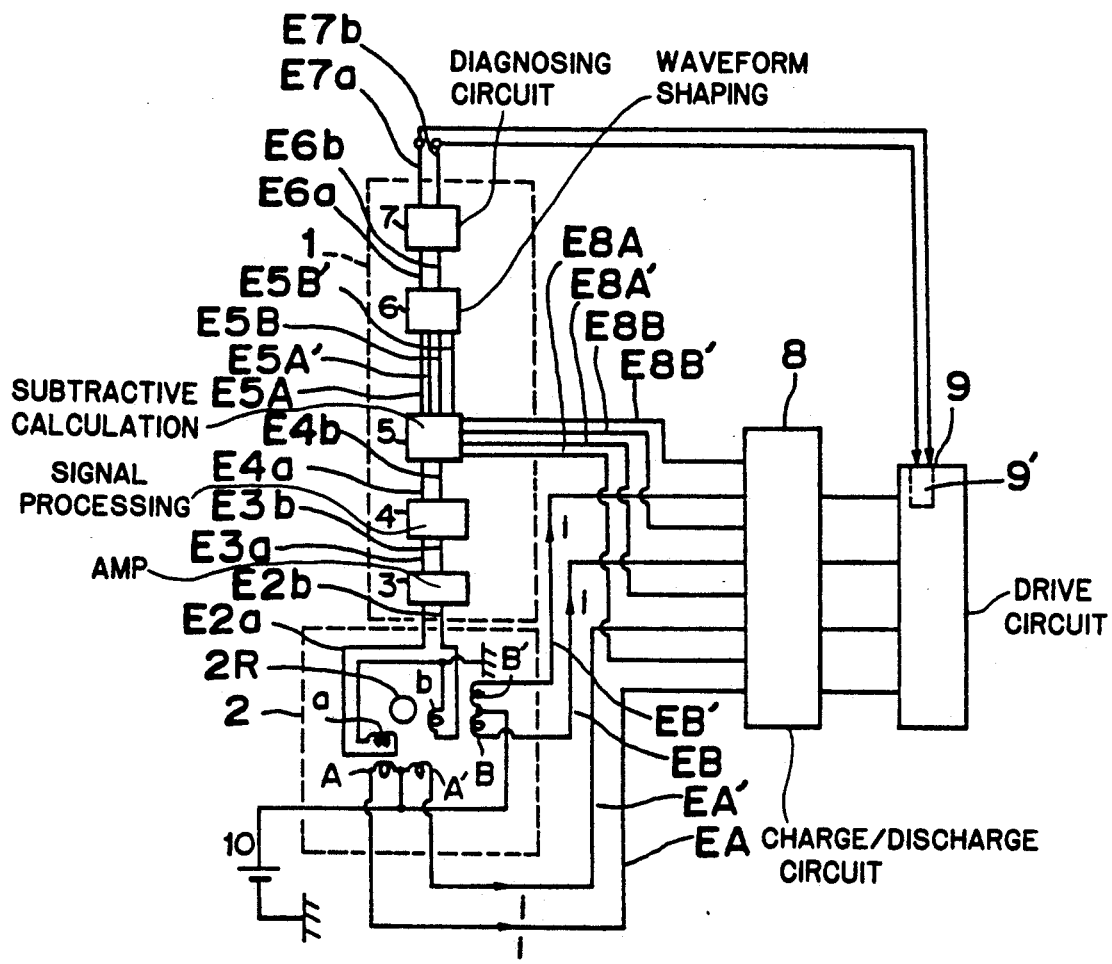
FIG. 1 is a block diagram of a rotation detecting unit of a stepping motor in accordance with a first embodiment of the present invention.

FIG. 1 shows a drive unit of a stepping motor in accordance with the present invention.

In FIG. 1, a rotation detecting circuit 1 comprises an output amplifier circuit 3, a signal processing circuit 4, a subtractive calculation circuit 5, a waveform shaping circuit 6, and a diagnosing circuit 7. There are provided detection coils a and b as a detection means for detecting terminal voltages yielded in main coils A, A', B, and B' provided at the stator of the stepping motor 2 other than the main coils A, A', B, and B'. It is noted that the detection coils a and b are magnetically combined respectively with the main coils A and B. Output signals yielded from the detection coils a and b are processed by way of the output amplifier circuit 3, the signal processing circuit 4, the subtractive calculation circuit 5, the waveform shaping circuit 6, and the diagnosing circuit 7. Further provided are a charge/discharge circuit 8, a drive circuit 9, a power source 10, and a control circuit 9' built in the drive circuit 9.

The following describes the operations of the drive unit of the stepping motor constructed as mentioned above with reference to FIGS. 1 through 6.

Figure 2:
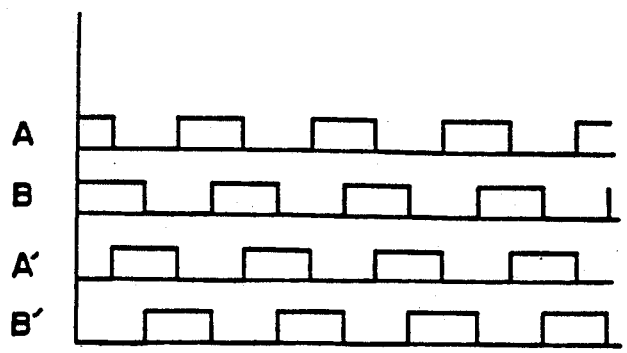
FIG. 2 is a timing chart of the excitation timing of the main coils A, A', B, and B' of the stepping motor in accordance with the first and second embodiments of the present invention.

In FIG. 1, firstly the main coils A, A', B, and B' are sequentially excited according to the phase relation as shown in FIG. 2 to thereby rotate the rotor 2R of the stepping motor 2 in FIG. 1. When the rotor 2R rotates, there are yielded terminal voltages E2a and E2b in the stepping motor 2, which are then outputted from the detection coils a and b in signal forms. The terminal voltages E2a and E2b have signal waveforms as exemplified in FIG. 3 (a). The signal waveforms of the terminal voltages E2a and E2b contain induction components attributed to the rotor 2R of the stepping motor 2 in FIG. 1 and induction components attributed to currents flowing through the main coils A, A', B, and B'. Therefore, by removing the induction components of the currents flowing through the main coils A, A', B, and B therefrom, only the induction components of the rotor 2R of the stepping motor 2 remain. In the present case, merely by subjecting the induction components of the rotor 2R to a signal processing, a rotation signal of the motor can be obtained.

The following describes a method of obtaining the rotation signal of the motor.

Firstly, as described above, the terminal voltages E2a and E2b yielded respectively in the detection coils a and b shown in FIG. 1 consists of induction components attributed to the rotor 2R of the stepping motor 2 and other induction components attributed to currents flowing through the main coils A, A', B, and B. Therefore, it is firstly necessary to remove the induction components attributed to the currents flowing through the main coils A, A', B, and B'. Postulating now that the currents flowing through the main coils A, A', B, and B are respectively iA, iA', iB, and iB' and induction components of the terminal voltages attributed to the currents iA, iA', iB, and iB' are respectively EA, EA', EB, and EB', the following equations 1 hold.

$$EA = K_1 \frac{diA}{dt}$$ [Equations 1]

$$EA' = K_2 \frac{diA'}{dt}$$

$$EB = K_3 \frac{diB}{dt}$$

$$EB' = K_4 \frac{diB'}{dt}$$

where $K_1$ through $K_4$ are constants, and $$\frac{diA}{dt}, \frac{diA'}{dt}, \frac{diB}{dt}, \text{ and } \frac{diB'}{dt}$$

are rate of change in time of currents iA, iA', iB, and iB'.

Therefore, by forming induction components as same as the induction components EA, EA', EB, and EB' in some manner and subtracting the formed induction components from the terminal voltages E2a and E2b yielded in the aforesaid detection coils a and b, only the objective induction components attributed to the rotor 2R can be obtained. In the present case, the induction components EA, EA', EB, and EB' caused by the currents flowing through the main coils A, A', B, and B' are removed by means of the charge/discharge circuit 8 in FIG. 1. In the charge/discharge circuit 8 in FIG. 1, the peak values of the voltage waveforms induced by the currents iA, iA', iB, and iB' flowing through the main coils A, A', B, and B' are momentarily held according to the excitation timing in FIG. 2 and then discharged to form waveforms E8A, E8A', E8B, and E8B' of which waveforms correspond to those of the induction components caused by the currents iA, iA', iB, and iB' flowing through the main coils A, A', B, and B' to be therefore utilized to remove the above-mentioned induction components. In other words, the following equations are applied to the unit in FIG. 1.

$$E8A = K_5 \frac{diA}{dt}$$ [Equations 2]

where $K_1$ through $K_4$ are constants, and are rate of change in time of currents iA, iA', iB, and $$E8A' = K_6 \frac{diA'}{dt}$$

$$E8B = K_7 \frac{diB}{dt}$$

$$E8B' = K_8 \frac{diB'}{dt}$$

$$\frac{diA}{dt}, \frac{diA'}{dt}, \frac{diB}{dt}, \text{ and } \frac{diB'}{dt}$$

iB'.

Therefore, by selecting the appropriate constants K1 through K8 from the [Equations 1] and [Equations 2], the induction components EA, EA', EB, and EB' caused by the currents iA, iA', iB, and iB' flowing through the main coils A, A', B, and B' can be removed by means of the charge/discharge circuit 8 in FIG. 1. In more detail, postulating now that the constants K1 through K8 have the relations of K1=K5, K2=K6, K3=K7, and K4=K8 in the [Equations 1] and [Equations 2], the following equations hold.

$$EA - E8A = 0$$ [Equations 3]
$$EA' - E8A' = 0$$
$$EB - E8B = 0$$
$$EB' - E8B' = 0$$

where K1=K5, K2=K6, K3=K7, and K4=K8 in the [Equations 1] and [Equations 2].

Then the following describes a method of selecting the appropriate constants in the [Equations 1] and [Equations 2].

Note that the constants in the [Equations 1] and [Equations 2] have dispersions depending on the motor and the constants of the charge/discharge circuit 8 in FIG. 1 have dispersions as well as that a consideration must be taken for the possible entrance of a signal other than the fundamental signals, e.g., a noise signal.

Figure 3A:
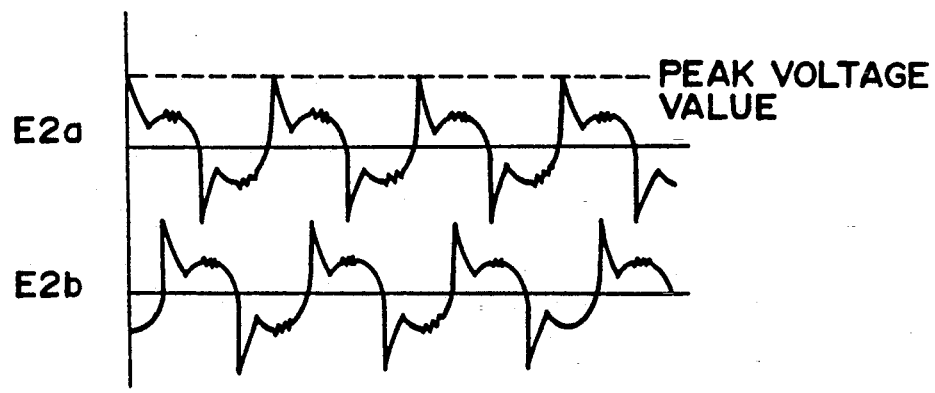
FIG. 3 (a) is a chart of output waveforms E2a and E2b respectively of the detection coils a and b in accordance with the first embodiment of the present invention.
Figure 3B:
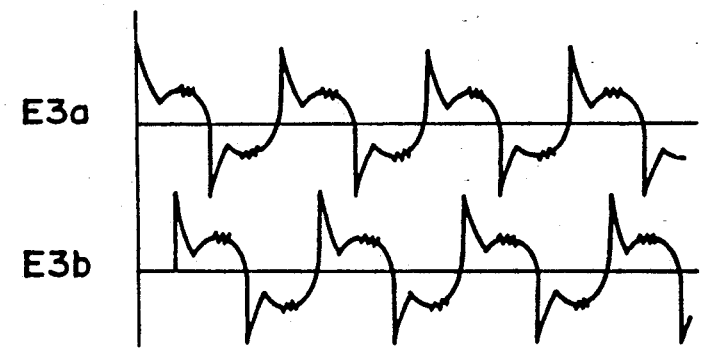
Figure 3C:
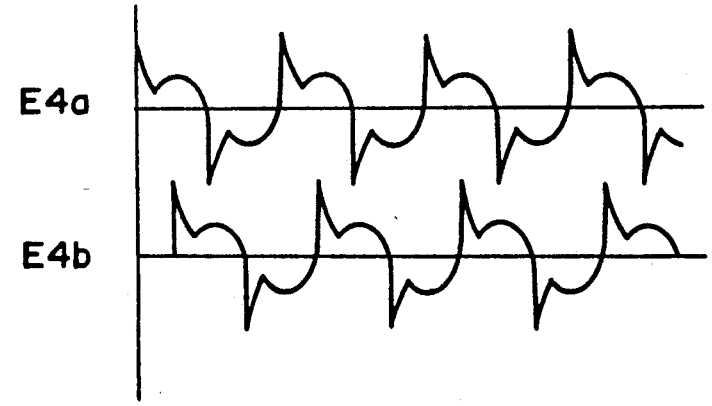

In order to absorb the dispersions of the stepping motor 2 and the charge/discharge circuit 8 in FIG. 1, the voltage levels of the induction components E2a and E2b from the detection coils a and b are adjusted in the output amplifier circuit 3 to be respectively E3a and E3b, and thereafter further changed respectively into signals E4a and E4b through removal of noise components, etc. by means of, for example, a low-pass filter or a band-pass filter in the signal processing circuit 4 to be then applied to the subtractive calculation circuit 5. FIG. 3 (a) shows exemplified waveforms E2a and E2b, FIG. 3 (b) shows exemplified waveforms E3a and E3b, and FIG. 3 (c) shows exemplified waveforms E4a and E4b.

According to the above-mentioned operations, the outputs E4a and E4b of the signal processing circuit 4 and the outputs E8A, E8A', E8B, and E8B' of the charge/discharge circuit 8 are subject to a subtractive calculation processing in the subtractive calculation circuit 5 in FIG. 1 to thereby remove the induction components EA, EA', EB, and EB' caused by the currents iA, iA', iB, and iB' flowing through the main coils A, A', B, and B'.

Figure 4A:
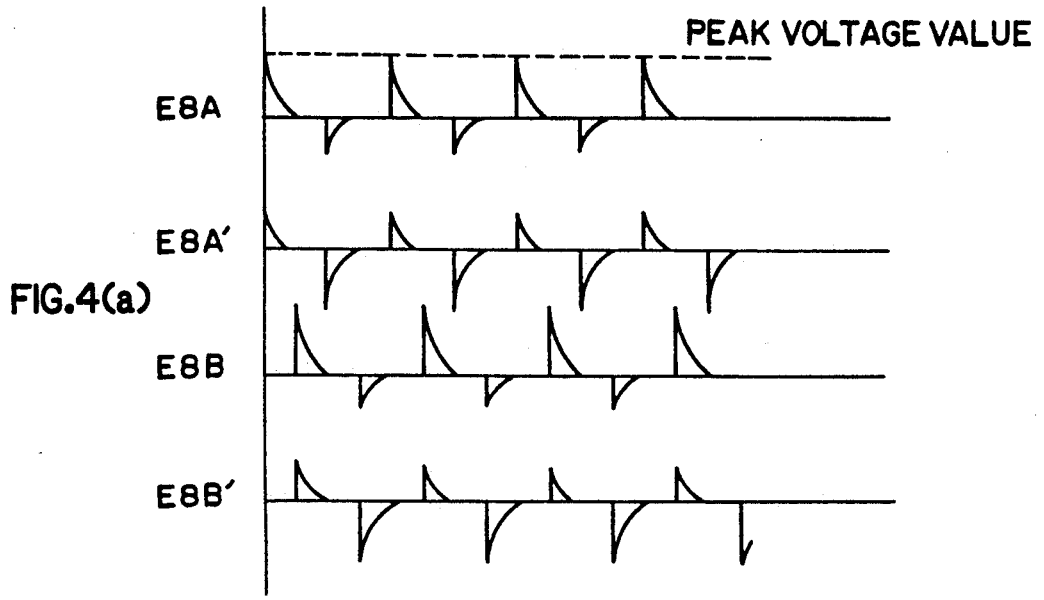
FIG. 4 (a) is a chart of output waveforms E8A, E8A', E8B, and E8B' of a charge/discharge circuit 8 in accordance with the first embodiment of the present invention.
Figure 4B:
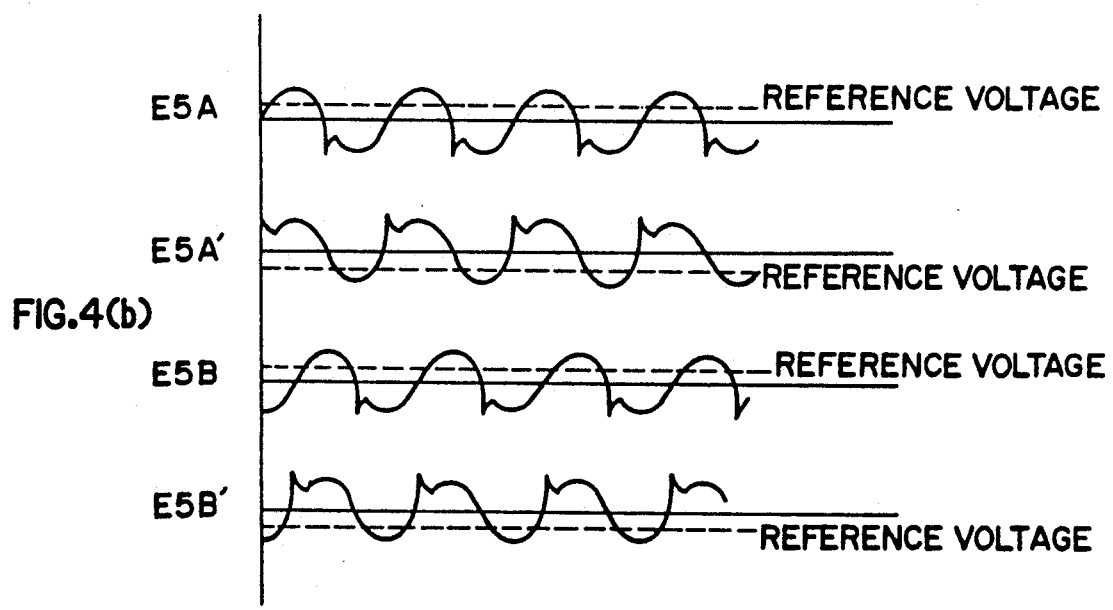

FIG. 4 shows the output voltages E8A, E8A', E8B, and E8B' of the charge/discharge circuit 8 and exemplified waveforms of the output voltages E5A, E5A', E5B, and E5B' of the subtractive calculation circuit 5 in FIG. 1. The output voltages with the waveforms E5A, E5A', E5B, and E5B' of the subtractive calculation circuit 5 are inputted to the waveform shaping circuit 6.

Then reference is made to the waveform shaping circuit 6 in FIG. 1.

Firstly the output terminal voltages E5A, E5A', E5B, and E5B' are inputted to the waveform shaping circuit 6 according to the phase relations as shown in FIG. 4.

In the waveform shaping circuit 6, firstly the output voltages E5A and E5B are converted into pulse waveforms with a reference voltage in the positive side while the outputs E5A' and E5B' are converted into pulse waveforms with a reference voltage in the negative side by means of a comparator as shown in FIG. 4 (b). The reason of the above arrangement is that the positive and negative voltage levels of the input waveforms E4a and E4b are not always equal to the corresponding voltage levels of the output waveforms E8A, E8A', E8B, and E8B' in the subtractive calculation circuit 5 in FIG. 1 due to magnetic influence, etc., to therefore permit a complete subtractive calculation only at the positive side or the negative side.

The above-mentioned comparator yields pulse waveforms E56A, E56A', E56B, and E56B' as shown in FIG. 5 (a).

However, the pulse waveforms E56A, E56A', E56B, and E56B' in FIG. 5 (a) are obtained by pulsing the output terminal voltages E5A, E5A', E5B, and E5B' in FIG. 4 (b) with the reference voltage either positive or negative, and therefore the pulse waveforms include unstable factors to hardly achieve a duty ratio of 50%. Therefore, by using a J-K flip-flop circuit adopted as a means for converting them to pulse waveforms each having a duty ratio of 50%, the pulse waveforms E56A, E56A', E56B, and E56B' in FIG. 5 (a) are converted into pulse waveforms having a duty ratio of 50%.

FIG. 5 (b) shows the pulse waveforms E6a and E6b each having a duty ratio of 50%. It is noted that the waveform E6a is obtained by shaping the waveforms E56A and E56A' in FIG. 5 (a), while the waveform E6b is obtained by shaping the waveforms E56B and E56B' in FIG. 5 (b). FIG. 5 (c) shows a block diagram of the waveform shaping circuit 6. The pulse waveforms each having a duty ratio of 50% obtained through the waveform shaping operations as described above are used to diagnose by the diagnosing circuit 7 in FIG. 1 whether the stepping motor 2 is rotating normally.

By means of an up/down counter, the diagnosing circuit 7 in FIG. 1 diagnoses whether the motor is rotating normally. When the motor is rotating normally, a pulse train of either uprise pulses or downfall pulses appears. When the motor is in an error condition, both a pulse train of uprise pulses and a pulse train of downfall pulses appear.

Figures 7A, 7B:
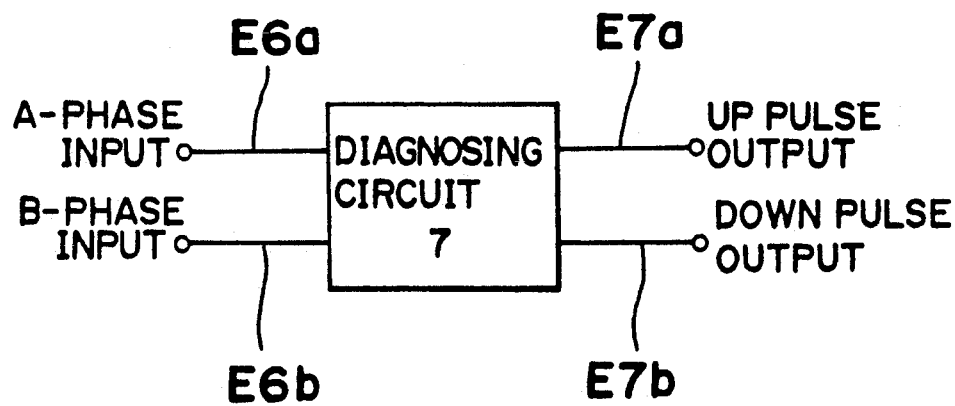
FIG. 7 (a) is a table showing relations between the inputs and outputs of the diagnosing circuit 7 in accordance with the first and second embodiments of the present invention.

FIGS. 6 (a) and 6 (b) show exemplified waveforms observed when the rotor is rotating normally without any step-out, while FIGS. 6 (c) and 6 (d) show exemplified waveforms observed when the rotor steps out, i.e. the motor is in an error condition. It is noted that waveforms E7a and E7b shown in FIG. 6 are the output waveforms of the diagnosing circuit 7 observed when the outputs E6a and E6b of the waveform shaping circuit 6 are inputted to the diagnosing circuit 7. FIG. 7 (a) shows a practical processing method in the diagnosing circuit 7, while FIG. 7 (b) shows a block diagram of the diagnosing circuit 7.

The following describes the control circuit 9' in FIG. 1.

Firstly the outputs E7a and E7b of the diagnosing circuit 7 are inputted to the control circuit 9' in FIG. 1. With regard to the outputs E7a and E7b, a pulse train of either uprise pulses or downfall pulses appears when the motor is rotating normally as shown in FIGS. 6 (a), 6 (b), 6 (c), and 6 (d), or pulse trains of both uprise pulses and downfall pulses appear when the motor is in an error condition. With the above arrangement the step-out amount is correctly represented by the amount of output pulses, and therefore, even when a step-out takes place by any possibility, a normal control can be recovered by carrying out a correcting operation by the step-out amount. The control circuit 9' in FIG. 1 is the circuit for carrying out the correcting operation as described above, and according to a command from the control circuit 9', the drive circuit 9 is operated. For example, a pulse train of a total of two downfall pulses appears in the output E7b in FIG. 6 (d), which means that a step-out corresponding to two pulses have taken place when the motor is normally rotating forward as compared with the waveforms in FIG. 6 (a). Therefore, the control circuit 9' transmits a command for rotating the motor forward further by two pulses to the drive circuit 9 for correction to thereby correctly control the stepping motor. Aside from the method of adding forward or reverse steps as described above, there is another control method of holding the stepping motor at the moment an error signal pulse is entered, which method can be put in practice easily. The possible step-out of the motor can be also prevented by detecting the phase of the output of the diagnosing circuit 7 in the control circuit 9' and changing the excitation phase or dispatching a command for increasing or decreasing the phase current.

According to the first embodiment as described above, by providing independent detection coils other than the main coils of the motor, the rotation of the rotor can be detected in a signal form without using any external component having a large capacity. The detected signal is used for diagnosing whether the motor is rotating normally to thereby correct any error such as step-out of the motor into a normal condition. Furthermore, a closed-loop control can be adopted to prevent the possible occurrence of step-out. It is also noted that the charge/discharge circuit 8 may be replaced with a digital filter to produce the same effect. Also, the charge/discharge circuit 8 may be replaced with a simple voltage dividing circuit employing a simple resistor network.

Second Embodiment

The following describes a second embodiment of the present invention with reference to the drawings.

Figure 8:
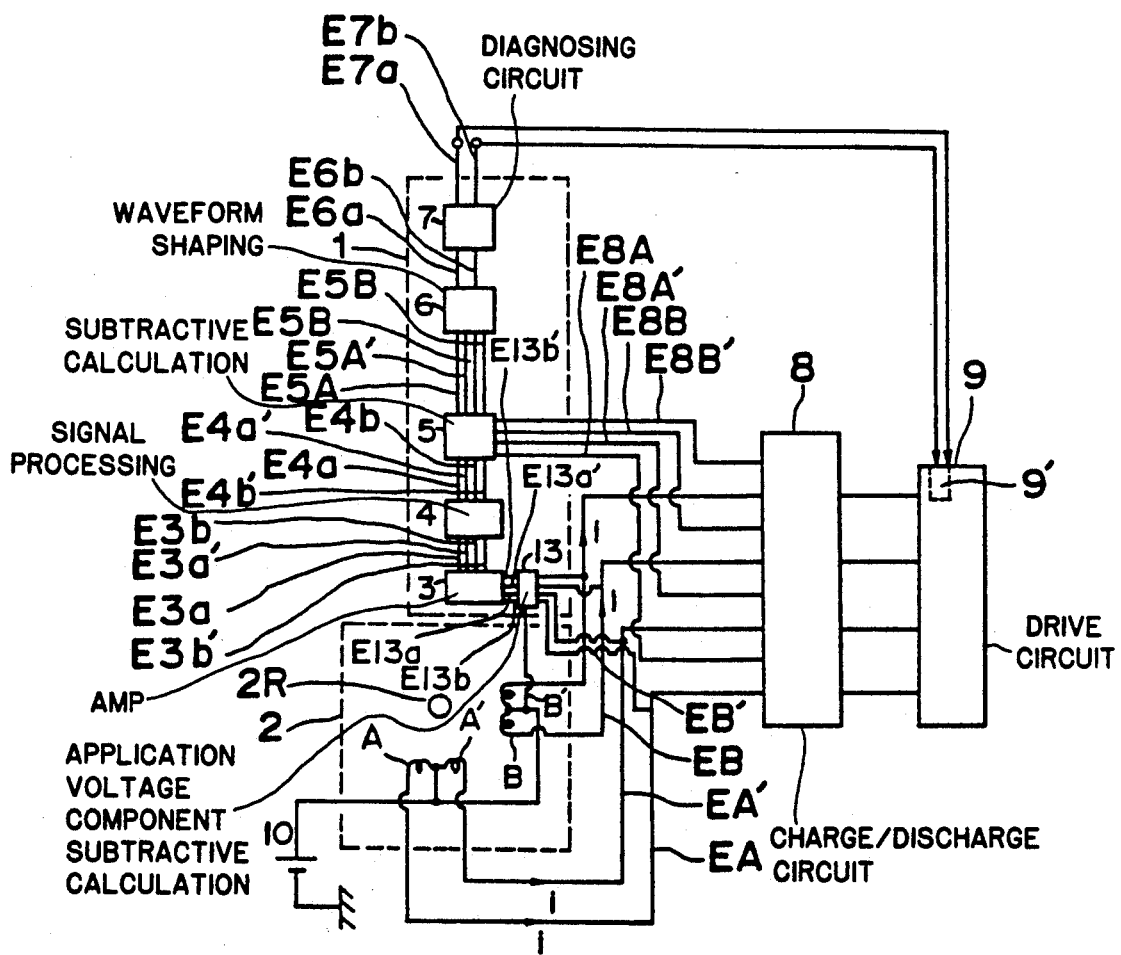
FIG. 8 is a block diagram of a rotation detecting unit of the stepping motor in accordance with the second embodiment of the present invention.

FIG. 8 shows a drive unit of a stepping motor in accordance with the second embodiment of the present invention.

In FIG. 8, a rotation detecting circuit 1 comprises an output amplifier circuit 3, a signal processing circuit 4, a subtractive calculation circuit 5, a waveform shaping circuit 6, and a diagnosing circuit 7. What is different from the construction in FIG. 1 is that the detection coils a and b which are provided separately from the main coils A, A', B, and B' of the stator of the stepping motor 2 for the purpose of detecting terminal voltages induced in the main coils A, A' and B, B' are eliminated. Note that the output signals EA, EA', EB, and EB' yielded from the main coils A, A', B, and B' are processed through the output amplifier circuit 3, the signal processing circuit 4, the subtractive calculation circuit 5, the waveform shaping circuit 6, and the diagnosing circuit 7. Further provided are a charge/discharge circuit 8, a drive circuit 9, a power source 10, an application voltage component subtractive calculation circuit 13, and a control circuit 9' built in the drive circuit 9.

The following describes the operations of the rotation detecting unit having the above-mentioned construction with reference to FIGS. 1 through 11.

In FIG. 8, firstly the main coils A, A', B, and B' are sequentially excited according to the phase relation as shown in FIG. 2 to thereby rotate the rotor 2R of the stepping motor 2 in FIG. 8. When the rotor 2R rotates, there are yielded output terminal voltages EA, EA', EB, and EB' of the motor 2, which are then outputted from the main coils A, A', B, and B' in signal forms. The terminal voltages EA, EA', EB, and EB' of the motor 2 have signal waveforms as exemplified in FIG. 9 (a). The signal waveforms of the terminal voltages EA, EA', EB, and EB' contain the combination of induction components attributed to the rotor 2R of the stepping motor 2, induction components attributed to currents flowing through the main coils A, A', B, and B', and the application voltage component. Therefore, by removing the induction components of the currents flowing through the main coils A, A', B, and B and the application voltage component, only the induction components of the rotor 2R of the stepping motor 2 remain. In the present case, merely by subjecting the induction components of the rotor 2R to a signal processing, a rotation signal of the motor can be obtained.

The following describes a method of obtaining the rotation signal.

Firstly, as described above, the output terminal voltages EA, EA', EB, and EB' yielded respectively in the main coils A, A', B, and B' in the motor 2 shown in FIG. 8 contain induction components attributed to the rotor 2R of the stepping motor 2, induction components attributed to currents flowing through the main coils A, A', B, and B, and the application voltage component. Therefore, it is necessary to remove the induction components attributed to the currents flowing through the main coils A, A', B, and B' and the application voltage component. Postulating now that the currents flowing through the main coils A, A', B, and B' are respectively iA, iA', iB, and iB', terminal voltage components attributed to the currents iA, iA', iB, and iB' are respectively Ea, Ea', Eb, and Eb', induction components attributed to the rotor 2R are ERa, ERa', ERb, and ERb', and the application voltage components are VA, VA', VB, and VB', the following equations 4 hold.

$$EA = Ea + VA + ERa \quad \text{[Equations 4]}$$
$$EB = Eb + VB + ERb$$
$$EA' = Ea' + Va' + ERa'$$
$$EB' = Eb' + VB' + ERb'$$

$K_1$ through $K_4$ are constants, and are rate of change in time of currents iA, iA', iB, and $$\frac{diA}{dt}, \frac{diA'}{dt}, \frac{diB}{dt}, \text{ and } \frac{diB'}{dt}$$

iB'.

Therefore, by forming induction components as same as the induction components Ea, Ea', Eb, and Eb' in some manner and subtracting the formed induction components as well as the application voltage components VA, VA', VB, and VB' from the induction voltages EA, EA', EB, and EB' yielded in the aforesaid main coils A, A', B, and B', only the objective induction components ERa, ERb, ERa', and ERb' attributed to the rotor 2R can be obtained.

Figure 9A:
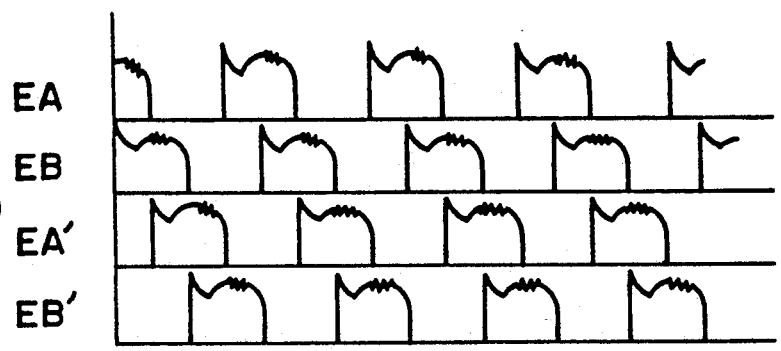
FIG. 9 (a) is a chart of output waveforms EA, EA', EB, and EB' of the main coils A, A', B, and B' in accordance with the second embodiment of the present invention.
Figure 9B:
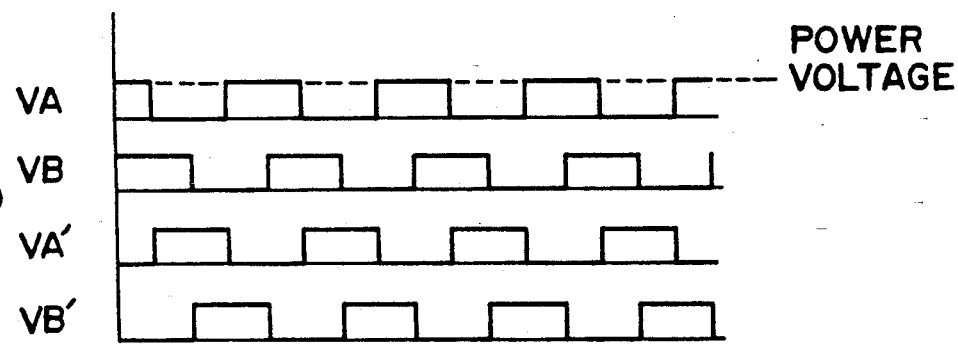
Figure 9C:
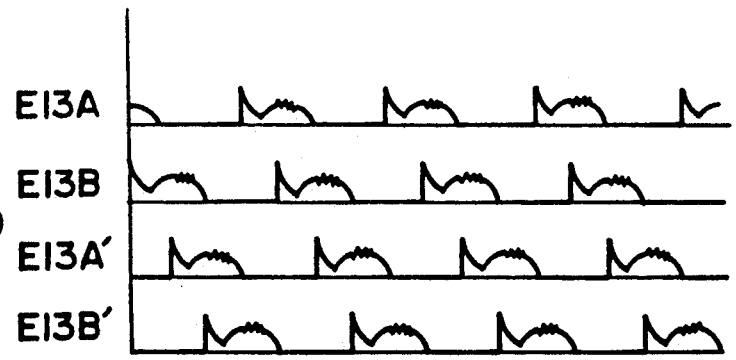

In the present case, firstly the power voltage components VA, VA', VB, and VB' applied to the main coils A, A', B, and B' are removed by means of the application voltage component subtractive calculation circuit 13 in FIG. 8. Exemplified waveforms of the application voltage components VA, VA', VB, and VB' are shown in FIG. 9 (b). The application voltage components can be obtained easily from the waveform of the power source 10 in FIG. 8 according to the excitation timing of each phase line shown in FIG. 2. Therefore, the application voltage component subtractive calculation circuit 13 in FIG. 8 forms output waveforms E13A, E13A', E13B, and E13B' as shown in FIG. 9 (c). Further by utilizing the [Equations 4], the following equations 5 hold.

$$E13A = EA - VA = Ea + ERa \quad \text{[Equations 5]}$$
$$E13B = EB - VB = Eb + ERb$$
$$E13A' = EA' - VA' = Ea' + ERa'$$
$$E13B' = EB' - VB' = Eb' + ERb'$$

Then the induction components Ea, Ea', Eb, and Eb' caused by the currents flowing through the main coils A, A', B, and B' are removed by means of the charge/discharge circuit 8 in FIG. 8. In the chargedischarge circuit 8 in FIG. 8, the peak values of the voltage waveforms induced by the currents iA, iA', iB, and iB' flowing through the main coils A, A', B, and B' are momentarily held according to the excitation timing in FIG. 2 and then discharged to form waveforms E8A, E8A', E8B, and E8B' of which waveforms correspond to those of the induction components caused by the currents iA, iA', iB, and iB' flowing through the main coils A, A', B, and B' to be therefore utilized to remove the above-mentioned induction components. In other words, the following equations are applied to the unit in FIG. 8.

$$E8A = K_5 \frac{diA}{dt} \quad \text{[Equations 6]}$$

where $K_5$ through $K_8$ are constants, and are rate of change in time of currents iA, iA', iB, and $$E8A' = K_6 \frac{diA'}{dt}$$

$$E8B = K_7 \frac{diB}{dt}$$

$$E8B' = K_8 \frac{diB'}{dt}$$

$$\frac{diA}{dt}, \frac{diA'}{dt}, \frac{diB}{dt}, \text{ and } \frac{diB'}{dt}$$

iB'.

Therefore by selecting the appropriate constants K1 through K8 from the [Equations 4] and [Equations 6], the induction components Ea, Ea', Eb, and Eb' caused by the currents iA, iA', iB, and iB' flowing through the main coils A, A', B, and B' can be removed by means of the charge/discharge circuit 8 in FIG. 8. In more detail, postulating now that the constants K1 through K8 have the relations of K1=K5, K2=K6, K3=K7, and K4=K8 in the [Equations 4] and [Equations 6], the following equations hold.

$$Ea - E8A = 0$$
$$Ea' - E8A' = 0$$
$$Eb - E8B = 0$$
$$Eb' - E8B' = 0$$
[Equations 7]

where K1=K5, K2 K6, K3 K7, and K4=K8 in the [Equations 4] and [Equations 6].

Then the following describes a method of selecting the appropriate constants in the [Equations 4] and [Equations 6].

Figure 10A:
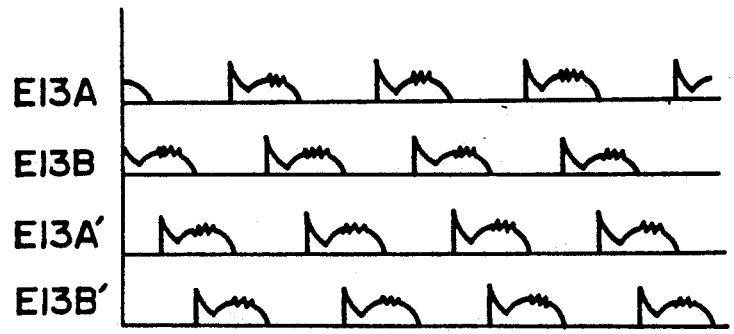
FIG. 10 (a) is a chart of output waveforms E13A, E13A', E13B, and E13B' of the application voltage component subtractive calculation circuit 13 in accordance with the second embodiment of the present invention.
Figure 10B:
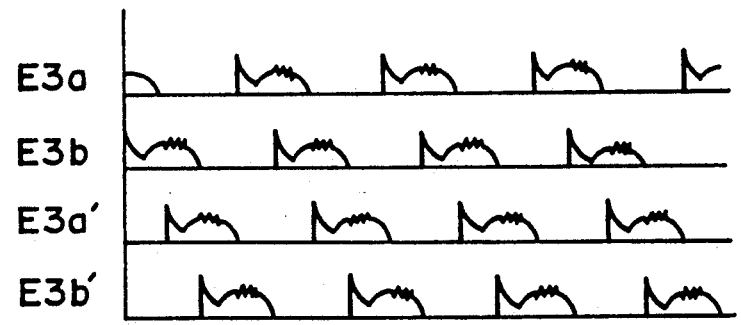
Figure 10C:
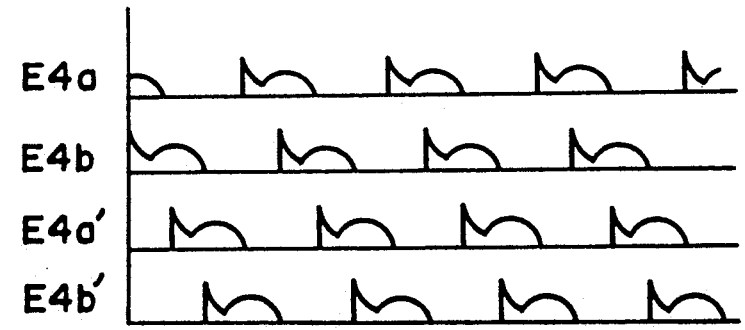

Note that the constants in the [Equations 4] and [Equations 6] have dispersions depending on the motor and the constants in the charge/discharge circuit 8 in FIG. 8 have dispersions as well and that a consideration must be taken for the possible entrance of such as a noise signal other than the fundamental signals. In order to absorb the dispersions of the constants depending on the stepping motor 2 and the charge/discharge circuit 8 in FIG. 8, the voltage levels of the output waveforms E13a, E13a', E13b, and E13b' of the application voltage component subtractive calculation circuit 13 are adjusted by the output amplifier circuit 3 to be respectively E3a, E3a', E3b, and E3b', and thereafter further changed respectively into signals E4a, E4a', E4b, and E4b' through removal of noise components and the like by means of, for example, a low-pass filter or a band-pass filter in the signal processing circuit 4 to be then inputted to the subtractive calculation circuit 5. FIG. 10 (a) shows exemplified waveforms E13a, E13a', E13b, and E13b', FIGS. 10 (b) shows exemplified waveforms E3a, E3a', E3b, and E3b', and FIG. 10 (c) shows exemplified waveforms E4a, E4a', E4b, and E4b'.

According to the above-mentioned operations, the outputs E4a, E4a', E4b, and E4b' of the signal processing circuit 4 and the outputs E8A, E8A', E8B, and E8B' of the charge/discharge circuit 8 are subject to a subtractive calculation processing in the subtractive calculation circuit 5 in FIG. 8, thereby enabling to remove the induction components Ea, Ea', Eb, and Eb' caused by the currents iA, iA', iB, and iB' flowing through the main coils A, A', B, and B' as well as to remove the application voltage components VA, VA', VB, and VB'.

Figure 11A:
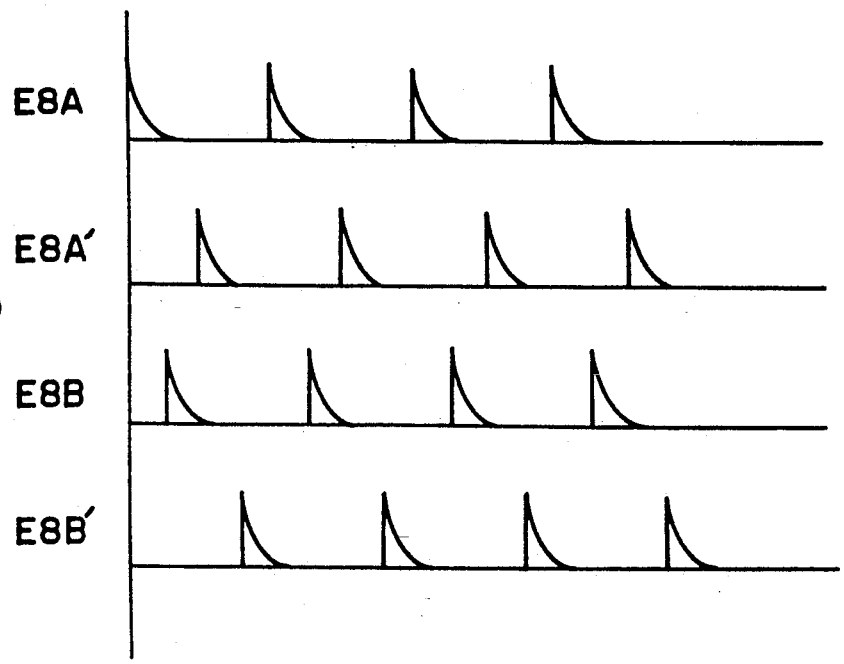
FIG. 11 (a) is a chart of output waveforms E8A, E8A', E8B, and E8B' of the charge/discharge circuit 8 in accordance with the second embodiment of the present invention.
Figure 11B:
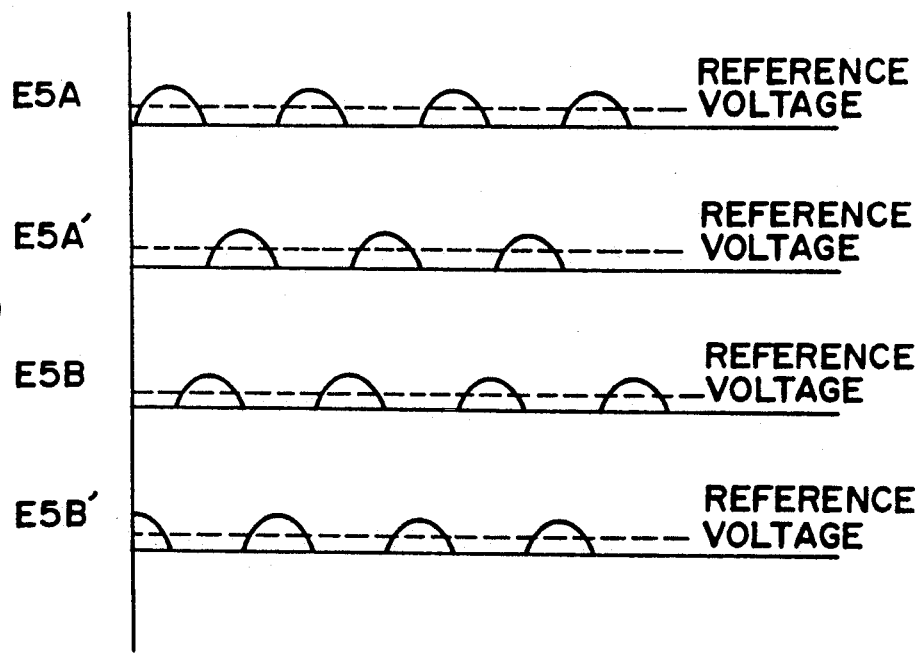
Figure 12A:
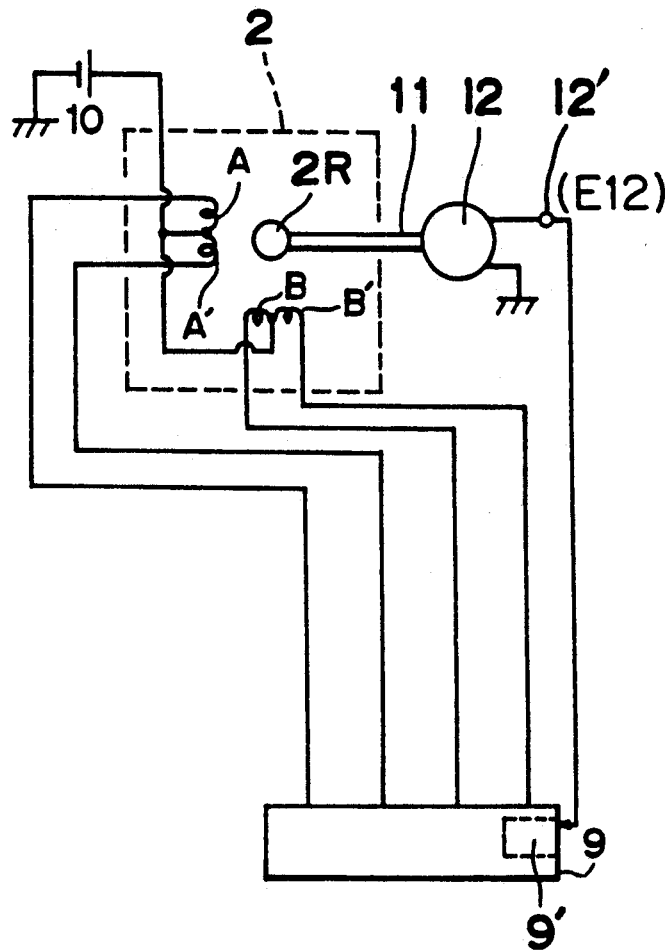
FIG. 12 (a) is a block diagram of the rotation detecting unit of a conventional stepping motor.
Figure 12B:
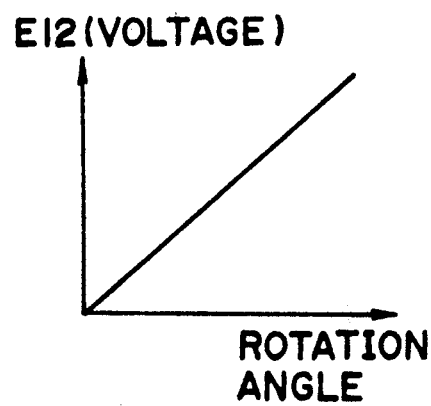

FIG. 11 shows the outputs E8A, E8A', E8B, and E8B' of the charge/discharge circuit 8 and the output waveforms E5A, E5A', E5B, and E5B' of the subtractive calculation circuit 5 in FIG. 8. The output voltages with the waveforms E5A, E5A', E5B, and E5B' of the subtractive calculation circuit 5 are inputted to the waveform shaping circuit 6.

Then reference is made to the waveform shaping circuit 6 in FIG. 8.

Firstly, the output induction voltages E5A, E5A', E5B, and E5B' of the subtractive calculation circuit 5 are inputted to the waveform shaping circuit 6 with the phase relations as shown in FIG. 11 (b).

In the waveform shaping circuit 6, firstly the above-mentioned voltages are converted into pulse waveforms with corresponding reference voltages by means of a comparator as shown in FIG. 11 (b). The pulse waveforms converted by the comparator are E56A, E56A', E56B, and E56B' in FIG. 5 (a) described with regard to the first embodiment. Therefore, it is a matter of course that the outputs of the waveform shaping circuit 6 and the diagnosing circuit 7 are similar to those in the first embodiment.

According to the second embodiment as described above, a signal representative of the rotation of the rotor can be detected to diagnose whether the motor is rotating normally without using any further detection coil separately from the main coils of the motor nor any external component having a large capacity. It is a matter of course that a replacement of the charge/discharge circuit 8 with a digital filter produces the same effect. Also, the charge/discharge circuit 8 can be replaced with a simple voltage dividing circuit employing a simple resistor network.

The present invention provides the following specific advantageous effects.

Firstly, a signal representative of the rotation of the objective stepping motor to be controlled can be detected without using any external sensor such as an encoder or a potentiometer or external component such as a transformer having a comparatively large current capacity. The above leads to an advantage in cost as well as reduction in size and weight in addition to the effect in function that the present unit is free of hysteresis characteristic and the like which is fatal in using a sensor. Regarding the anti-environmental properties, the present unit achieves an advantageous rotation detection to realize a superior control of a stepping motor.

Furthermore, a charge/discharge circuit is used as a waveform processing means together with an output amplifier circuit to flexibly cope with the possible dispersions of the constants depending on the motor and formed current.

Therefore, in the case of applying the present stepping motor drive unit to, for example, a suspension control system in an automobile, there can be expected a superior effect such as preventing the automobile from entering into a dangerous condition where the automobile looses its balance due to step-out of a motor. The same effect as above can be also expected when the present unit is applied to a four-wheel steering system, an engine control system, a power steering system, and the like in the field of automobiles. It is also promising to apply the present unit to a field of information equipments such as a sheet feeding controller in a printer or household equipments such as an air conditioner and video tape recorder, leading to an advantageous effect of reduction in size and weight of the motor employed therein and reduction in energy consumption for operating the apparatuses.

Although the present invention has been fully described by way of examples with reference to the accompanying drawings, it is to be noted here that various changes and modifications will be apparent to those skilled in the art. Therefore, unless otherwise such changes and modifications depart from the scope of the present invention as described by the appended claims, they should be constructed as included therein.

What is claimed is:

1. A drive unit for driving a stepping motor comprising:

main coil means provided at a stator of the stepping motor;

rotation detecting coil means for detecting terminal voltages of the stepping motor yielded in said main coil means and producing an output;

means for generating voltage waveforms corresponding to the induction components caused by the currents flowing through said main coil means;

subtractive calculation means for subtracting the voltage waveforms from said output of said rotation detecting coil means and for producing an output; and drive circuit means for driving the stepping motor as a function of the subtractive calculation means output.

2. The drive unit for driving a stepping motor according to claim 1, wherein said main coil means in the stepping motor has at least one phase line and said means for generating voltage waveforms is provided on said at least one phase line of said main coil means in the stepping motor.

3. The drive unit for driving a stepping motor according to claim 2, further comprising amplifier means for amplifying the output of said means for generating voltage waveforms provided on said at least one phase line of said main coil means in the stepping motor.

4. The drive unit for driving a stepping motor according to claim 2 or 3, further comprising signal processing means for processing any output signal of said subtractive calculation means, said rotation detecting coil means, or said means for generating voltage waveforms through a filter means.

5. The drive unit for driving a stepping motor according to claim 4, further comprising waveform shaping means for shaping a waveform of an output of said signal processing means through comparator means.

6. The drive unit for driving a stepping motor according to claim 5, further comprising diagnosing means for diagnosing whether the stepping motor is normally rotating by detecting the pulse amount and pulse timing of an output of said waveform shaping means, and control means for controlling the stepping motor to rotate forward rotate reverse, or hold, or effecting changeover of excitation phase, increasing or decreasing phase current, and other operations.

7. A drive unit for driving a stepping motor without using rotation detecting coil means, comprising:

main coil means provided at a stator of the stepping motor; for producing an output means for generating voltage waveforms corresponding to the induction components caused by the currents flowing through said main coil means;

application voltage subtractive calculation means for subtracting a voltage applied to the stepping motor from an output of said main coil means and producing an output;

subtractive calculation means for subtracting the voltage waveforms from said output of said application voltage subtractive calculation means and for producing an output; and drive circuit means for driving the stepping motor as a function of the subtractive calculation means output.

8. The drive unit for driving a stepping motor according to claim 6, wherein said means for generating voltage waveforms comprises a voltage peak detecting circuit operating in conformity with the application timing of pulses for controlling the stepping motor.

9. The drive unit for driving a stepping motor according to claim 6, wherein said means for generating voltage waveforms comprises a simple voltage dividing circuit having a simple resistor network.

10. The drive unit for driving a stepping motor according to claim 7, wherein said means for generating voltage waveforms is constructed by a voltage peak detecting circuit operating in conformity with the application timing of pulses for controlling the stepping motor.

11. The drive unit for driving a stepping motor according to claim 7, wherein said means for generating voltage waveforms is constructed by a simple voltage dividing circuit employing a simple resistor network.

* * * * *

UNITED STATES PATENT AND TRADEMARK OFFICE
CERTIFICATE OF CORRECTION

PATENT NO. : 5,298,846
DATED : March 29, 1994
INVENTOR(S) : Michihiro Shimizu et al It is certified that error appears in the above-indentified patent and that said Letters Patent is hereby corrected as shown below:

column 14, claim 6, line 1, after "forward" insert --,--.

column 14, claim 7, line 7, after "motor" delete ";"; and after "output" insert --;--.

column 14, claim 7, line 13, after "from" delete "an" and insert --said--.

Signed and Sealed this

Eighteenth Day of October, 1994

Attest:

BRUCE LEHMAN

*Attesting Officer*   *Commissioner of Patents and Trademarks*